Aug. 9, 1960 T R. SAINT 2,948,618
METHOD FOR BREWING COFFEE
Filed Dec. 23, 1957 4 Sheets-Sheet 1
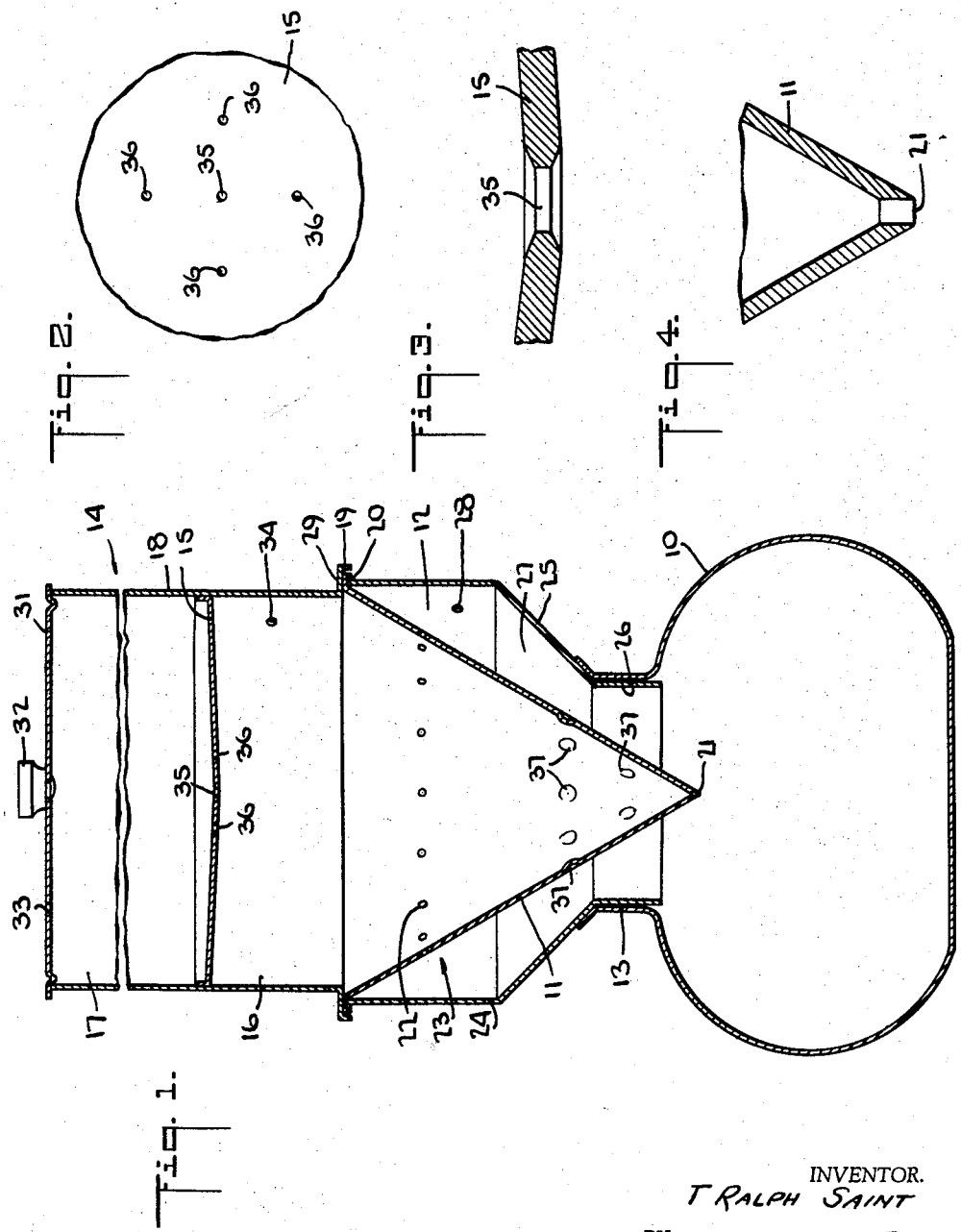
INVENTOR.
T RALPH SAINT
BY
ATTORNEY Aug. 9, 1960    T R. SAINT    2,948,618
METHOD FOR BREWING COFFEE
Filed Dec. 23, 1957    4 Sheets-Sheet 2
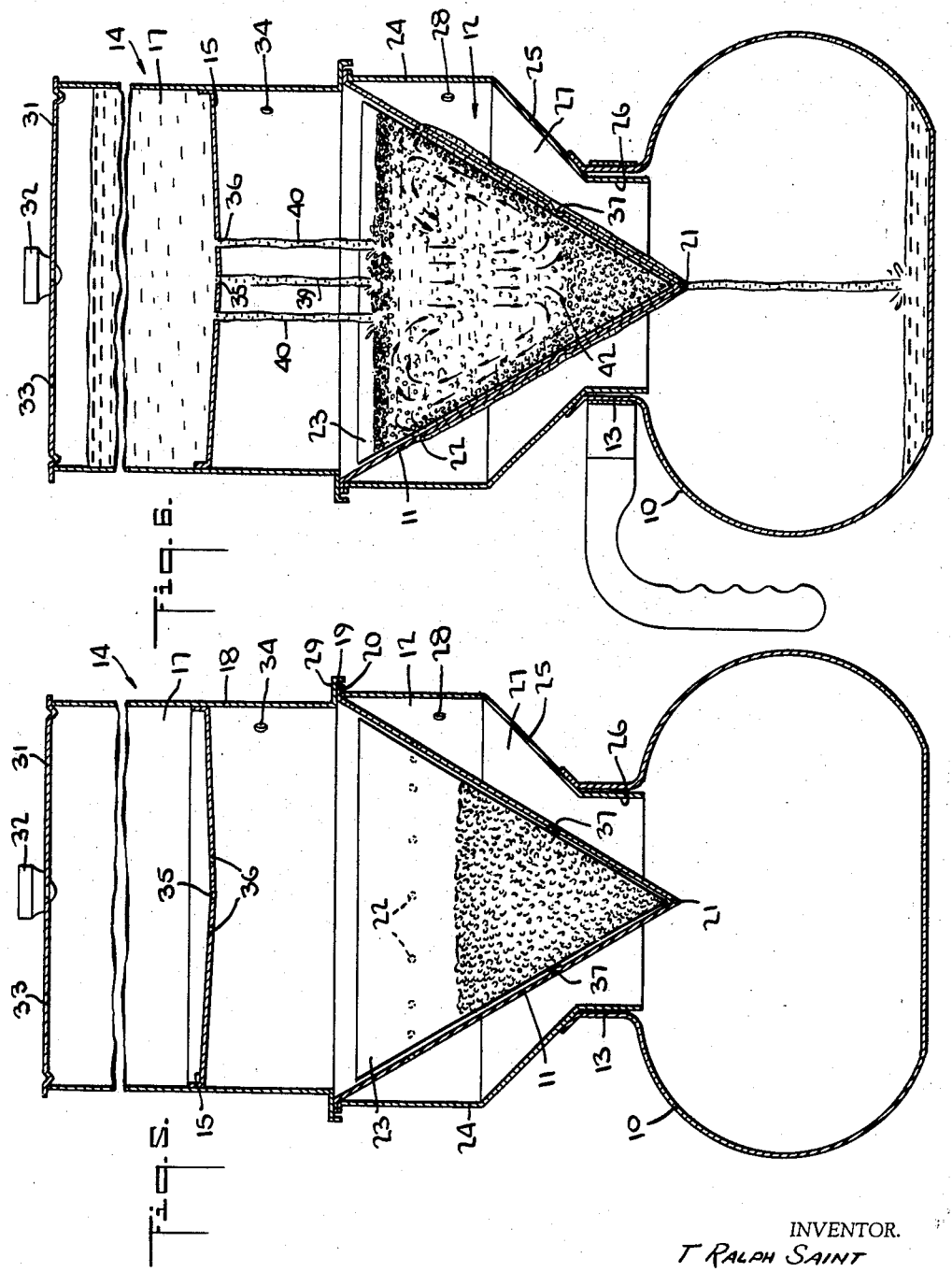
INVENTOR.
T RALPH SAINT
BY
ATTORNEY

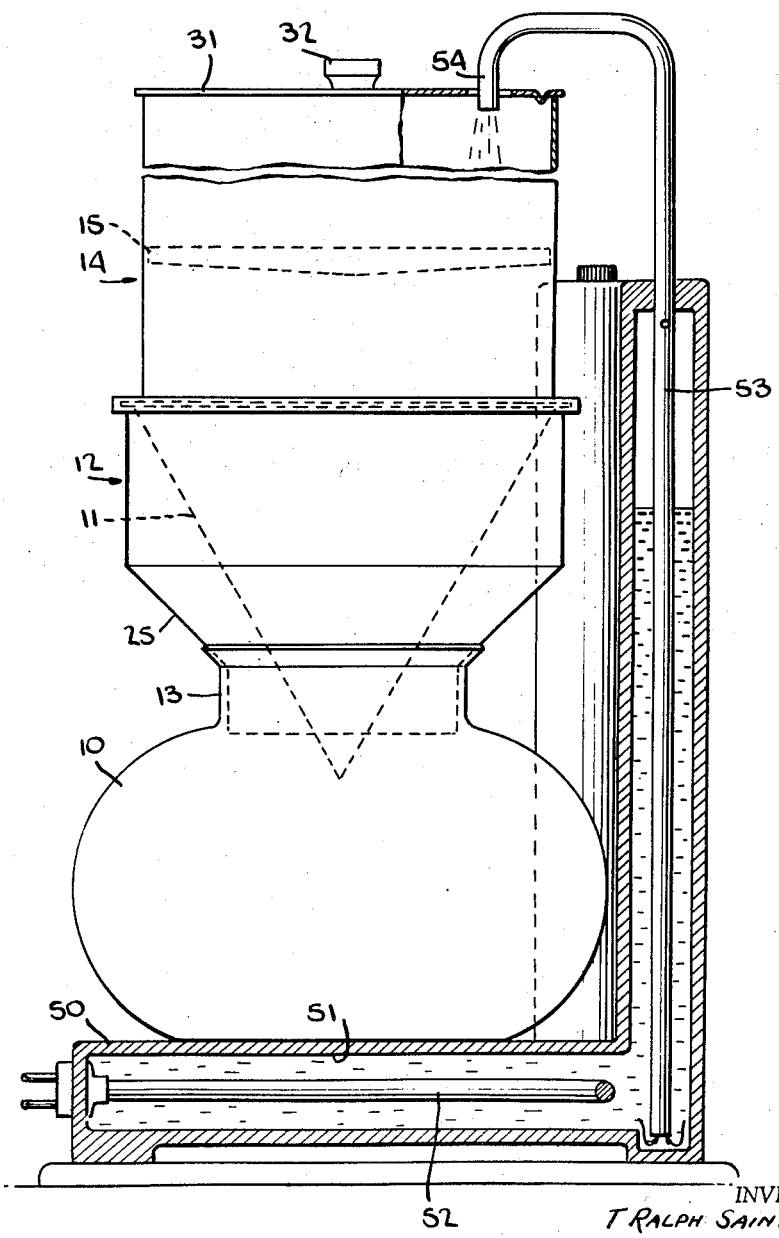

Aug. 9, 1960
T R. SAINT
2,948,618
METHOD FOR BREWING COFFEE
Filed Dec. 23, 1957
4 Sheets-Sheet 4
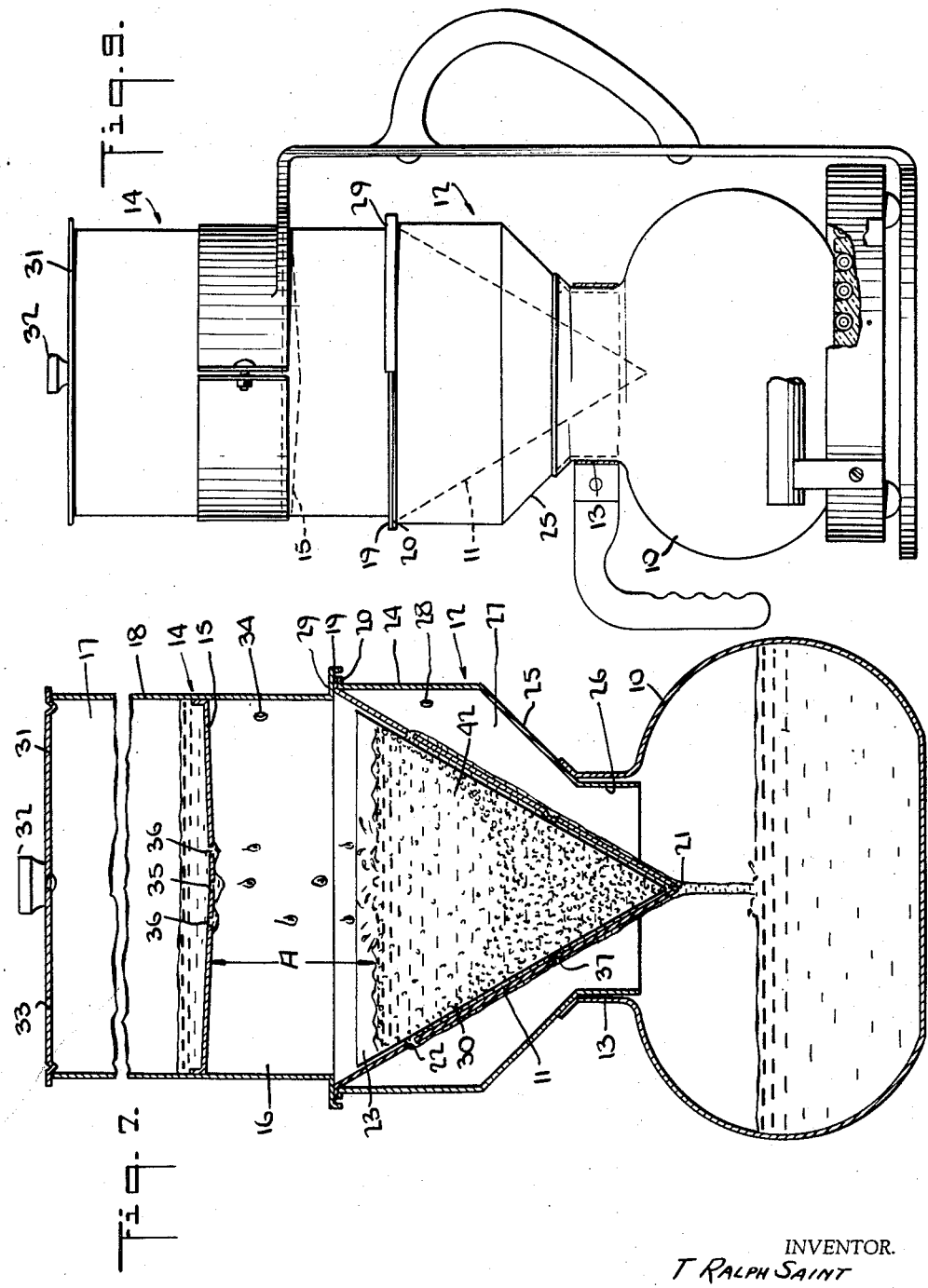
INVENTOR.
T RALPH SAINT
BY
Frank G. Bower
ATTORNEY

United States Patent Office 2,948,618
Patented Aug. 9, 1960

2,948,618
METHOD FOR BREWING COFFEE

T Ralph Saint, Bogota, N.J., assignor to Jabez Burns & Sons, Inc., New York, N.Y., a corporation of New York Filed Dec. 23, 1957, Ser. No. 704,630

3 Claims. (Cl. 99—71)

This invention relates to a method for brewing coffee and tea, particularly coffee, in small quantities by draining water at a temperature just below boiling through the coffee grounds and separating the coffee grounds from the brew to form a clear brew of the desirable coffee tasting compounds.

Coffee makers, particularly small sized coffee makers for domestic use, should meet certain requirements. These requirements may generally be divided into two groups, one relating to the brewing of good coffee and the other relating to the components of the coffee maker. In brewing coffee, an extraction of the desirable coffee tasting compounds should be obtained within a period of less than ten minutes with a complete separation of the coffee grounds and the accompanying sediment from the brew resulting in a clear coffee brew. The coffee making apparatus should be so constructed as to be free from contamination due to repeated use, producing equally good results from each brewing operation. In addition, the apparatus should be simple in structure and inexpensive to manufacture. The attention required by the apparatus during the brewing process should be at a minimum and the process should complete itself without further attention than that of setting up the apparatus and adding the water and ground coffee.

The main object of this invention is to provide a brewing process and apparatus which fully meets the above requirements and provides substantially the same percentage of extraction from the coffee granules each time coffee is brewed.

Other objects of the invention will become apparent from the following description taken in connection with the drawings, in which:

Fig. 1 is a sectional view of the coffee maker and the receptacle for receiving the coffee brew.

Fig. 2 is a detailed fragmentary view of the bottom of the water reservoir.

Fig. 3 is a detailed sectional view of one of the openings.

Fig. 4 is a detailed sectional view of the apex opening of the conical member holding the coffee.

Figs. 5, 6 and 7 are fragmentary sectional views illustrating the coffee brewing process.

Fig. 8 illustrates the coffee maker with an automatic heating and supplying of the water to the reservoir.

Fig. 9 illustrates a stand for supporting the liquid reservoir holding member.

In Figs. 1 to 4 an embodiment of a coffee maker is shown in accordance with the invention. In this embodiment the coffee maker is supported by a receptacle 10 into which the final coffee brew is delivered. The coffee maker comprises a conically shaped coffee holding member 11 supported by an outer casing 12 which fits in the neck 13 of the receptacle 10. A liquid reservoir holding member 14 sets on top of the lower unit and has a bottom 15 to form a chamber 17 above the bottom for holding the water for delivery to the conical unit. The wall 18 extends below the bottom 15 to form the space 16 below the bottom of the reservoir member 14 and the top of the conical member 11. The wall 18 of the reservoir member and the casing 12 are preferably cylindrical in shape. The conical member 11 has smooth, solid walls extending from the apex to the flange 19 engaging and secured to the flange 20 of the casing 12. The apex has a cylindrical opening 21 axially aligned with the axis of the conical member, as shown in detail in Fig. 4. The apex opening has a small diameter to restrict the flow of brew from the end of the conical member. At the upper end of the conical member a row of overflow openings 22 is provided extending circumferentially around the conical member. The overflow openings prevent the mixture of water and grounds from rising above the upper edge of the filter paper 23 fitting in the conical member, as shown in Figs. 5 to 7. In the embodiment shown in Fig. 1, sixteen openings are provided. However, a number of rows and different sized openings may be used instead of a single row.

The casing 12 has a cylindrical portion 24, a conical portion 25 and an end cylindrical portion 26 for fitting in the receptacle 10. The casing 12 is spaced from the conical member to form an insulating chamber 27 to maintain the coffee brew at the proper temperature within the conical member. A vent opening 28 is provided in the cylindrical wall 24 for exhausting the vapors and steam from the receptacle 10 and retaining the pressure within the casing and receptacle at atmospheric pressure so that the brew will readily drain from the conical member.

The wall 18 of the reservoir member has a slightly smaller diameter than the cylindrical member 24 and the conical member and extends radially within the upper edge of the conical member so that condensation of steam from the brew in the conical member drips back into the chamber formed by the conical member. A circumferential flange 29 is formed around the bottom edge of the wall 18 for engaging the flange of the casing 12 and the conical member 11 to support and hold the reservoir member on the casing 12. The upper end of the reservoir member is open and a cover 31 with a knob 32 may be provided for snugly fitting and closing the top of the chamber 17. A vent opening 33 is provided in the cover, and a vent opening 34 is provided in the wall 18 below the bottom 15 to vent the steam from the apparatus and maintain the chamber 16 at atmospheric pressure.

Generally, the process comprises fitting the casing 12 with the conical unit 11 in the receptacle 10 and placing a conically shaped filter 23 into the conical member to rest against the inner surface of the wall and extend from the apex opening to a given distance above the overflow openings 22. The desired amount of ground coffee is then measured into the filter paper and the unit 14 is set on top. The boiling water is then added in a measured quantity to the chamber 17. Under the pressure of the head of water in the chamber 17 the water is forced through the openings 35 and 36 in continuous streams which fill the chamber of the conical member with a mixture of water and coffee to a level above the overflow openings 22. The coffee brew drains through the opening 21 and the overflow openings 22 and collects in the receptacle 10. The brew is separated from the coffee grounds and sediment by the filter paper 23. As the water finally drains from the chamber 17, the level of the mixture of coffee grounds and water drops and the final brew drains through the apex opening 21. Circumferentially spaced indentations 37 are provided in the conical member at a distance above the apex 21 to space the filter paper away from the conical member in order to provide channels for draining the brew around the spent grounds collected at the bottom of the filter paper. The indentations are preferably formed in two rows of four indentations each with the indentations of the two rows staggered. When the brew has finally drained from the conical member, the reservoir member 14 may be removed and the filter paper containing the spent coffee grounds lifted out and disposed of.

The conical member is preferably made of stainless steel or any other suitable non-contaminating material and after use it need only be rinsed with clear, warm water to remove any of the brew adhering to its surface. As only clear water has come into contact with the reservoir member, this member need only be dried. The casing 12 and conical member may be then removed from the receptacle 10 and the coffee is ready to serve. The filtering means is preferably a filter paper. However, other suitable means which separate the brew from the grounds and sediment may be used.

The water in the chamber 17, while draining into the conical member, is at approximately 205° F. The draining action and the contact of the water with the ground coffee drops the temperature of the water in the chamber of the conical member to between 185° and 200° F. The temperatures in the chamber 17 and in the conical member remain substantially constant throughout the brewing process so that the coffee grounds are continuously bathed in a brew of between 185° and 200° F. which extracts all of the desirable coffee solubles and leaves the bitter tasting, undesirable coffee solubles in the granules.

Considering the brewing process in greater detail in connection with Figs. 5 to 7, the openings 35 are clustered in the center of the bottom 15 over the apex of the conical member. The upper and lower edges of each of the openings are beveled to produce the desired type of flow and action required to secure the proper extraction from the coffee grounds. A cross sectional view of one of these openings is shown in Fig. 3. The center opening 35 is slightly smaller than the other openings 36 and the upper and lower edges are beveled to secure the proper flowing action. The pressure produced by the head of water in the chamber 17 causes the streams 39 and 40 to issue from the openings 35 and 36, respectively, at a rapid and forceful rate to penetrate and saturate the grounds in the conical chamber. The flow is of such a rapid rate that it penetrates through the center of the grounds and a trickling of coffee brew issues from the apex opening 21. The rapid flow of water fills the conical member, soaking some of the coffee grounds at the center and lifting the ground coffee around the stream. The carbon dioxide and air adhering to the surface of, and in the spaces between the coffee grounds causes the grounds to float on the surface of the water and rise with it, as indicated in Fig. 6. The water level rises above the openings 22 and an equilibrium is reached between the draining of the water from the apex opening 21 and the overflow orifices 22 and the delivery of the water from the orifices 35 and 36. As the ground coffee is rising with the level of the water, a depositing of grains and an extraction of the brew is occurring. The agitation of the water produces a washing of the granules to remove the coffee oils.

The force of the centrally clustered streams 39 and 40 causes the streams to penetrate the water 41 in the conical chamber, carrying the granules coming in contact therewith down into the bottom of the conical member. The force of the streams churns the water and causes the water to circulate and rise adjacent to the sides of the conical member and sweep along the bottom of the floating granules. The granules are swept by the washing action and are freed of the carbon dioxide on their surfaces. They then sink slowly through the water 42 which is being turned into a coffee brew by the extraction of the coffee oils from the granules due to the washing action and the dropping movement of the granules through the water 42. As indicated by the arrows in Fig. 6, the motion of the water in the center between the central downward stream and the side of the conical member is upward. This motion is counter to the downward movement of the granules from the floating layer. This movement of the grounds and the water in opposite directions has the further effect of sweeping the granules free of the carbon dioxide and removing the desirable coffee tasting compounds. A further washing action is produced by the movement of the brew draining through the overflow openings. This movement is along the peripheral edge area of the floating granules which extends circumferentially around the conical member.

The head of water in the chamber 17 diminishes with a corresponding diminution of the force of the streams, and by the time the water from the chamber 17 is expended, nearly all of the coffee grounds have been stripped from the floating layer and those remaining on the surface of the water are suspended in carbon dioxide bubbles forming a foam across the surface of the water. These granules are separated from the foam by a subsequent and different action of the water draining from the chamber 17. The remaining water, due to the size of the openings 35 and 36 and the loss of head in the chamber, instead of issuing as a stream from the bottom plate 15, forms droplets which drip at a continuous rate from the openings in the plate 15 and impinge on the center area of the surface of the water 42. This central impingement on the water sets up a rhythmic wave motion propagating from the center area outwardly to the edges of the water along the filter. This wave motion provides a constant agitation of the surface of the water, and the wave agitation of the remaining granules breaks up the foam of bubbles and granules and causes the coffee granules to drop down through the water 42. The droplet action is facilitated by the concave shape of the bottom 15 and the shape of the openings therein. The bottom 15 is bowed so that the lowest part of the bottom is the center portion containing the openings 35 and 36. The remainder of the water collects at the center portion and drips through the openings. The upper and under edges of the openings are beveled so that the water will readily pass through the openings without pressure and at the very end the droplets may adhere to the bottom and collect at the opening in the center. The water then drops off the bottom. The size of the openings and the distance of the level of the water from the bottom 15 is important. The level of the water should not be less than a distance A from the bottom 15 in order to provide sufficient energy to the drip to form waves on the surface of the water. This distance should be sufficient to form a droplet which gains sufficient speed to strike the surface of the brew with force.

The ground coffee is subjected to a washing and agitating action to extract the coffee solubles from the coffee grounds. The conical chamber is of a size to receive the required amount of coffee and to submerge the coffee completely. The rate of the discharge of the water from the apex opening is slower than that of water from the chamber 17. The water in the conical member builds up, raising the level of the water and the floating granules. The water in the conical chamber maintains its level by the feeding of water into the chamber faster than it drains from the conical member. The level is maintained to present a larger surface for the action of the droplets, so that a full wave effect is produced. The level drops slowly so that the dripping water from the chamber 17 has time to separate the remaining floating granules. The streams come from the bottom until the granules drop to the bottom, except for the granules suspended in the foam. The droplet action then commences to produce the wave action which shakes the remaining granules free.

In the drawing, the openings in the bottom 15 are clustered in the center of the plate. The spent grains 30 collect at the bottom and on the sides of the filter and by the time the last of the granules have had the coffee extracted therefrom, the water from the chamber is expended, or the level of the water which is now a coffee brew has drained off through the openings 22 and dropped below them, so that the remaining water drains through the filter paper and the apex opening 21. The final draining of the coffee brew through the apex opening 21 occurs at such a rate as to complete the draining of the water or coffee brew within a period of generally ten minutes.

The coffee maker may be adapted to various capacities. In a coffee maker having a maximum capacity of six cups the conical member has a depth of 4⅜ inches and a diameter of 5 inches across the upper open end. The chamber 17 has a diameter of 4¾ inches and a height of 3⅞ inches and can hold from two to six cups of water. The center of the bottom plate is approximately 5⅞ inches above the apex and the overflow openings approximately 3⅛ inches from the apex. The apex opening 21 has a diameter of .0595 inch and the sixteen overflow openings 22 each have a diameter of .1285 inch. The openings 35 and 36 in the bottom 15 have diameters of .042 and .035 inch, respectively, and are preferably circumferentially arranged within a radius of one-half an inch. With these openings the brew will rise to within two to two and one-half inches from the bottom plate at full capacity. The percentages of extraction of runs using from two to six cups of water are set forth in the following Table I.

*Table I*

| Number of Cups | Percent Extraction of Total Weight of Coffee | Percent Extraction of Coffee Tasting Solubles |
| --- | --- | --- |
| 6 | 20.7 | 82.8 |
| 5 | 20.6 | 82.4 |
| 4 | 20.0 | 80.0 |
| 3 | 19.3 | 77.2 |
| 2 | 18.0 | 72.0 |

For an eight cup coffee maker the dimensions and hole sizes would be changed to secure the type of operation described above. A table of the percentages of extraction using from three to eight cups of water is set forth in the following Table II.

*Table II*

| Number of Cups | Percent Extraction of Total Weight of Coffee | Percent Extraction of Coffee Tasting Solubles |
| --- | --- | --- |
| 8 | 21.6 | 86.4 |
| 7 | 20.8 | 83.2 |
| 6 | 20.6 | 82.2 |
| 5 | 20.0 | 80.0 |
| 4 | 20.2 | 80.8 |
| 3 | 18.8 | 72.0 |

It may be seen from these tabulations that nearly a complete extraction of the desirable coffee compounds may be obtained over a range of amounts of water.

The requisites have been fulfilled. A complete extraction of the desirable coffee compounds has been secured without removing the less desirable tasting compounds. The coffee brew is separated from the grounds and sediment so that the brew has a clear, pleasant color and a taste uncontaminated by sediment.

The coffee maker is inexpensive to manufacture. The reservoir member and the lower member are easily manufactured by inexpensive and well-known processes and do not require any intricate shapes or forms. There are no surfaces or corners which become contaminated with spent coffee. The only member requiring cleaning after each use is the conical member, which may be freed of any contamination by rinsing with water. The use of detergents or the scrubbing of the various parts is not required. Thus, after each use a minimum of attention is required to restore the unit to a condition suitable for subsequent coffee brewing. Therefore, there is no accumulation of coffee deposits through repeated use without adequate subsequent cleaning.

The manipulative steps are at a minimum and no attention to the brewing is required once the process is initiated. The openings in the bottom plate regulate the flow of water into the conical member and produce a stirring action which brings each ground into contact with the water for a sufficient period of time to permit a complete extraction.

Another advantage arising from the versatility of the apparatus is that any type of coffee may be used. The coffee may be of the regular grind, drip type or silex type of grind. Thus, the coffee maker can use any of the grinds presently available.

The process may be made fully automatic by providing a stand with an automatic water heater which raises the water to the boiling point and then delivers it to the chamber 17. This is diagrammatically indicated in Fig. 8 in which the base 50 has a chamber 51 for containing water up to an amount of eight cups. A heating element 52 is located in the base which may be made of metal. The pipe 53 is mounted in the base and connected to the chamber 51. The pipe has a spout 54 to direct the water into the chamber 17 when it reaches the boiling point and is forced out of the chamber by the steam. The receptacle 10 sets on the casing, but is at a temperature below 200° F. and preferably at approximately 160° to 185° F. to keep the coffee hot.

In Fig. 9 another improvement is illustrated for ease in handling the coffee maker. A stand 60 is provided with a base 61 and an upright support 62. The support 62 has an arm 63 with a clamp 64. The clamp holds the container 14 in position above the conical member so that the conical member and the glass receptacle can be moved out from under the container 14. Thus, the container 14 may remain in place while the conical member is removed for filling with coffee or removing the spent granules and washed. The clamp is held closed by a bolt 65 and a wing nut 66, or other suitable fastening means. A hot plate 67 may be provided to maintain the brew hot. If the hot plate is not used, the fastening means may be loosened and the container lowered and positioned on the conical member. Thus, the proper relation may be maintained between the orifices in the bottom and the level of the brew.

Thus, it may be seen that with a minimum of effort a fine tasting coffee brew may be repeatedly and economically made. However, the invention may also be used to brew tea or other similar products.

The apparatus described in this invention may be modified and changed without departing from the invention as set forth in the appended claims.

I claim:

1. A process for brewing coffee comprising forming ground coffee in a mass, subjecting the coffee to streams of water at 185° F. to 200° F. impinging on the center portion of the mass and filling the mass with water forming a body of hot water with a layer of ground coffee floating on the surface of the water, subjecting the layer of ground coffee to streams of hot water impinging on the center of the body of hot water and carrying granules of coffee downward and then circulating the water upward to sweep the water along the bottom of the layer and remove coffee granules therefrom until a thin layer of ground coffee remains on the surface in bubbles of escaped gases, dropping the granules downward through the water to extract the coffee therefrom while separating the coffee brew from the coffee granules, subjecting the remaining thin layer of coffee to a dripping action over a period of time to strip the remaining coffee granules from the bubbles on the surface and finally separating the coffee brew from the coffee grounds to form a clear coffee brew.

2. A process for brewing coffee comprising forming ground coffee in a mass, subjecting the coffee to streams of water at 185° F. to 200° F. impinging on the mass and filling the mass with water forming a body of hot water with a layer of ground coffee floating on the surface of the water, subjecting the layer of ground coffee to a steady flow of hot water impinging on a small portion of the surface of the water and driving through the layer of ground coffee with the body of hot water carrying granules of coffee downward and then circulating upward to sweep the water along the bottom of the layer and remove coffee granules therefrom until a thin layer of ground coffee remains on the surface in bubbles of escaped gases, dropping the granules downward through the water to extract the coffee therefrom while separating the coffee brew from the coffee granules, subjecting the remaining thin layer of coffee to a dripping action over a period of time to strip the remaining coffee granules from the bubbles on the surface and finally separating the coffee brew from the coffee grounds to from a clear coffee brew.

3. A process for brewing coffee comprising forming ground coffee in a mass on a filtering medium, subjecting the coffee to a steady flow of water at 185° F. to 200° F. impinging on the mass and filling the mass with water forming a body of hot water with a layer of ground coffee floating on the surface of the water, withdrawing the coffee brew through the filtering medium at a substantially steady flow to maintain the free surface of the body of water at a substantially constant level, subjecting the layer of ground coffee to a steady flow of hot water impinging on a small portion of the surface of the water and driving through the layer of ground coffee with the body of hot water and carrying granules of coffee downward and then circulating upward to sweep the water along the bottom of the layer and remove coffee granules therefrom, dropping the granules downward through the water to extract the coffee therefrom while separating the coffee brew from the coffee granules, forming a thin layer of the remaining coffee grounds suspended in bubbles of escaped gases on the surface of the water, discontinuing the steady flow of water and subjecting the remaining thin layer of coffee to a dripping action over a period of time to strip the remaining coffee granules from the bubbles on the surface and finally separating the coffee brew from the coffee grounds by drawing the coffee brew through the filtering medium to form a clear coffee brew.

References Cited in the file of this patent

UNITED STATES PATENTS

| | | |
|---|---|---|
| 1,549,840 | Lemmoine | Aug. 18, 1925 |
| 1,648,699 | Shroyer | Nov. 8, 1927 |
| 1,971,490 | Keith | Aug. 28, 1934 |
| 2,107,236 | Cory | Feb. 1, 1938 |
| 2,273,422 | Schroeder | Feb. 17, 1942 |
| 2,338,140 | States | Jan. 4, 1944 |
| 2,401,529 | Varney et al. | June 4, 1946 |
| 2,403,691 | States | July 9, 1946 |
| 2,496,237 | Smith | Jan. 31, 1950 |
| 2,681,154 | Schlumbohm | June 15, 1954 |